United States Patent
Gross et al.

(10) Patent No.: US 10,375,556 B2
(45) Date of Patent: Aug. 6, 2019

(54) EMERGENCY CALL SERVICE BACKUP USING DEVICE USER PLANE COMMUNICATIONS

(71) Applicants: International Business Machines Corporation, Armonk, NY (US); LaaSer Critical Communications Corporation, Ft Lauderdale, FL (US)

(72) Inventors: Brent Gross, Calgary (CA); Sushain Pandit, Austin, TX (US); Guenter A. Sauter, Ridgefield, CT (US); Charles D. Wolfson, Austin, TX (US); Michael R. Self, Ft Lauderdale, FL (US); Frederick L. White, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/851,094

(22) Filed: Dec. 21, 2017

(65) Prior Publication Data
US 2019/0200204 A1    Jun. 27, 2019

(51) Int. Cl.
*H04W 76/18* (2018.01)
*H04W 4/90* (2018.01)
(Continued)

(52) U.S. Cl.
CPC .............. *H04W 4/90* (2018.02); *H04W 4/025* (2013.01); *H04W 4/029* (2018.02); *H04W 76/18* (2018.02);
(Continued)

(58) Field of Classification Search
CPC ....... H04W 4/90; H04W 4/029; H04W 4/025; H04W 76/18; H04W 76/50; H04W 76/16; H04W 60/005
See application file for complete search history.

(56) References Cited

U.S. PATENT DOCUMENTS 5,937,355 A    8/1999  Joong et al.
6,240,285 B1   5/2001  Blum et al.
(Continued)

FOREIGN PATENT DOCUMENTS

CN    1166099 A      11/1997
DE    10135576 A1    2/2003
(Continued)

OTHER PUBLICATIONS

N. Aschenbruck, "Traffic characteristics and modeling of emergency calls at the PSAP," 2009 IEEE International Symposium on Modeling, Analysis & Simulation of Computer and Telecommunication Systems, London, 2009, pp. 1-8.
(Continued)

*Primary Examiner* — Chuong A Ngo
(74) *Attorney, Agent, or Firm* — Garg Law Firm, PLLC; Rakesh Garg; Reza Sarbakhsh

(57) ABSTRACT

An initiation of an emergency communication with an emergency service associated with an emergency telephone number is detected by a mobile communications device. A completion of the emergency communication using a first communication path associated with a mobile communications service provider is attempted. The mobile communication device determines that the emergency communication using the first communication path has failed. An identity of a destination of the failed emergency communication is determined using location and telemetry data from the mobile communication device. A connection of the mobile communications device to the identified destination is facilitated using a second communication path. The mobile communications device is identified to the determined destination as an originator of the connection.

18 Claims, 5 Drawing Sheets

(51) Int. Cl.
*H04W 76/50* (2018.01)
*H04W 4/02* (2018.01)
*H04W 4/029* (2018.01)
*H04W 60/00* (2009.01)
*H04W 76/16* (2018.01)

(52) U.S. Cl.
CPC .......... *H04W 76/50* (2018.02); *H04W 60/005* (2013.01); *H04W 76/16* (2018.02)

(56) References Cited

U.S. PATENT DOCUMENTS

| | | | |
|---|---|---|---|
| 6,246,872 | B1 | 6/2001 | Lee et al. |
| 6,327,342 | B1 | 12/2001 | Mobley et al. |
| 6,801,762 | B1 | 10/2004 | Huilgol |
| 7,260,186 | B2 | 8/2007 | Zhu et al. |
| 7,395,045 | B2 | 7/2008 | Jijina et al. |
| 7,440,442 | B2 | 10/2008 | Grabelsky et al. |
| 8,098,798 | B2 | 1/2012 | Goldman et al. |
| 8,451,987 | B1 | 5/2013 | Rozier et al. |
| 8,700,052 | B2 | 4/2014 | Modi et al. |
| 9,582,985 | B2 | 2/2017 | Shurtz |
| 2007/0049267 | A1* | 3/2007 | Kota ............ G01S 5/0036 455/423 |
| 2009/0171907 | A1 | 7/2009 | Radovanovic |
| 2014/0341358 | A1* | 11/2014 | Goswami ......... H04W 4/029 379/45 |
| 2015/0006500 | A1 | 1/2015 | Ambasta et al. |
| 2015/0012529 | A1 | 1/2015 | Emanuel et al. |
| 2016/0063120 | A1 | 3/2016 | Ivchenko |
| 2017/0109445 | A1 | 4/2017 | Daya et al. |
| 2017/0366955 | A1* | 12/2017 | Edge ............ H04W 4/90 |

FOREIGN PATENT DOCUMENTS

| | | |
|---|---|---|
| KR | 20090083769 A | 8/2009 |
| WO | 2016198920 A1 | 12/2016 |

OTHER PUBLICATIONS

C. Davids, "Next Generation 911: Where Are We? What Have We Learned? What Lies Ahead?," in IEEE Communications Magazine, vol. 55, No. 1, pp. 130-131, Jan. 2017.

S. S. Wang, "Mobile positioning technologies and location services," Proceedings RAWCON 2002. 2002 IEEE Radio and Wireless Conference (Cat. No. 02EX573), 2002, pp. 9-12.

K. K. A. Zahid, "IP network for emergency service." Oct. 2004 MUM '04: Proceedings of the 3rd international conference on Mobile and ubiquitous multimedia, 99. 165-170, 2004.

M. El Barachi, "Enhancing the QoS and Resource Management Aspects of the 3GPP IMS Emergency Service Architecture," 2008 5th IEEE Consumer Communications and Networking Conference, Las Vegas, NV, 2008, pp. 112-116.

Sarkas et al., Measuredriven KeywordQuery Expansion, VLDB Endowment, Aug. 2428, 2009, Lyon, France.

PCT, International Searching Authority, PCT/162018/060414, Apr. 17, 2019.

* cited by examiner

EMERGENCY CALL SERVICE BACKUP USING DEVICE USER PLANE COMMUNICATIONS

TECHNICAL FIELD

The present invention relates generally to a method, system, and computer program product for emergency call service backup. More particularly, the present invention relates to a method, system, and computer program product for emergency call service backup using device user plane communications.

BACKGROUND

When an emergency call is initiated by a caller, communication service providers (CSPs), such as phone service providers or carriers are responsible for connecting the emergency call to an appropriate Public Safety Answering Point (PSAP). A PSAP is a call center responsible for answering emergency calls directed to an emergency telephone number (e.g., a 911 call in the United States) for an emergency service such as a police service, a firefighting service, or an ambulance service. The PSAP often also dispatches the emergency services to the location of the caller. Governing bodies will typically assign PSAPs to cover a particular area such that emergency calls originating within the area are directed to the PSAP covering the area. An emergency call may refer to any type of emergency communication such as a traditional 911 voice call, a 911 text message, a 911 voice over IP (VOIP) call, an emergency call using a number other than 911, etc.

In existing systems, determining the particular PSAP to which an emergency call is to be routed typically involves a process of determining the approximate location of the call, comparing the approximate location to a grid of PSAP boundaries, and then connecting the call to the telephone number of the appropriate PSAP. A typical emergency call center of a communication service provider infrastructure includes a number of components responsible only for emergency calls including Selective Routers. Traditionally, a Selective Router is the component that determines the location of the originator of the emergency call and routes the call to the appropriate PSAP. The Selective Router typically queries a selective routing database to match the origination of the call to the network location of the appropriate PSAP.

The emergency call system is a complicated system with many components, all of which may become inoperative due to misconfiguration of components or other issues such as hardware failure, network outage, software error, and power outage. Currently, backup systems are implemented in case of failure. However, if there are component misconfiguration issues, the misconfiguration issues are likely to also affect the backup systems as well, and the emergency call will be unable to be placed. These type of outages leading to the inability to complete an emergency call have led to harm and loss of life to the general population, and have resulted in large fines for the service providers obligated to provide such emergency communications.

The illustrative embodiments recognize that existing procedures for emergency call service backup are reliant upon proper configuration and function of the backup system of the communication system provider that are subject to failure do to hardware failure, misconfiguration, and other issues. The illustrative embodiments recognize that it would be useful to provide a backup system for emergency services with the ability to route around failures in call routing between the caller's device and the end PSAP's customer premise equipment (CPE) using device user plane communications.

SUMMARY

The illustrative embodiments provide a method, system, and computer program product. An embodiment of a method for emergency communication service backup includes detecting, by a mobile communications device, an initiation of an emergency communication with an emergency service associated with an emergency telephone number. The embodiment further includes attempting completion of the emergency communication using a first communication path associated with a mobile communications service provider. The embodiment further includes determining, by the mobile communication device, that the emergency communication using the first communication path has failed. The embodiment further includes determining, using location and telemetry data from the mobile communication device, an identity of a destination of the failed emergency communication. The embodiment still further includes facilitating a connection of the mobile communications device to the identified destination using a second communication path. In the embodiment, the mobile communications device is identified to the determined destination as an originator of the connection. Thus, the embodiment provides a solution to existing problems in emergency call service backup by providing a backup emergency call system that is not subject to misconfiguration and/or hardware failures of the backup emergency system of the communication service provider.

In another embodiment, the second communication path uses a previously unused portion of a network of the mobile communications service provider. In another embodiment, the second communication path bypasses emergency communication components associated with the mobile communications service provider.

Another embodiment further includes determining enhanced location information based upon the location information and telemetry data, and providing the enhanced location information to the mobile communications service provider. In another embodiment, the location information includes a latitude and longitude of the mobile device. In another embodiment, the enhanced location information includes one or more of a pressure, elevation, or floor of a building associated with a location of the mobile device.

Another embodiment further includes receiving updated location information and telemetry data from the mobile device, the updated location information and telemetry data includes a change in location and telemetry of the mobile device since the initiating of the emergency communication.

Another embodiment further includes notifying the mobile communications service provider of the failed emergency communication. Another embodiment further includes tracking locations of failed emergency communications of at least one of the mobile device and other mobile devices, a frequency of the failed emergency communications, and an identity information of the mobile communications service provider. Another embodiment further includes storing historical information of the failed emergency communications.

Another embodiment further includes determining a failure probability of subsequent emergency communications based upon the historical information, and determining at least one preventative action to mitigate subsequent emergency communication failures based upon the failure probability. In another embodiment, the at least one preventative measure includes selectively changing network routing in a particular geographic area.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
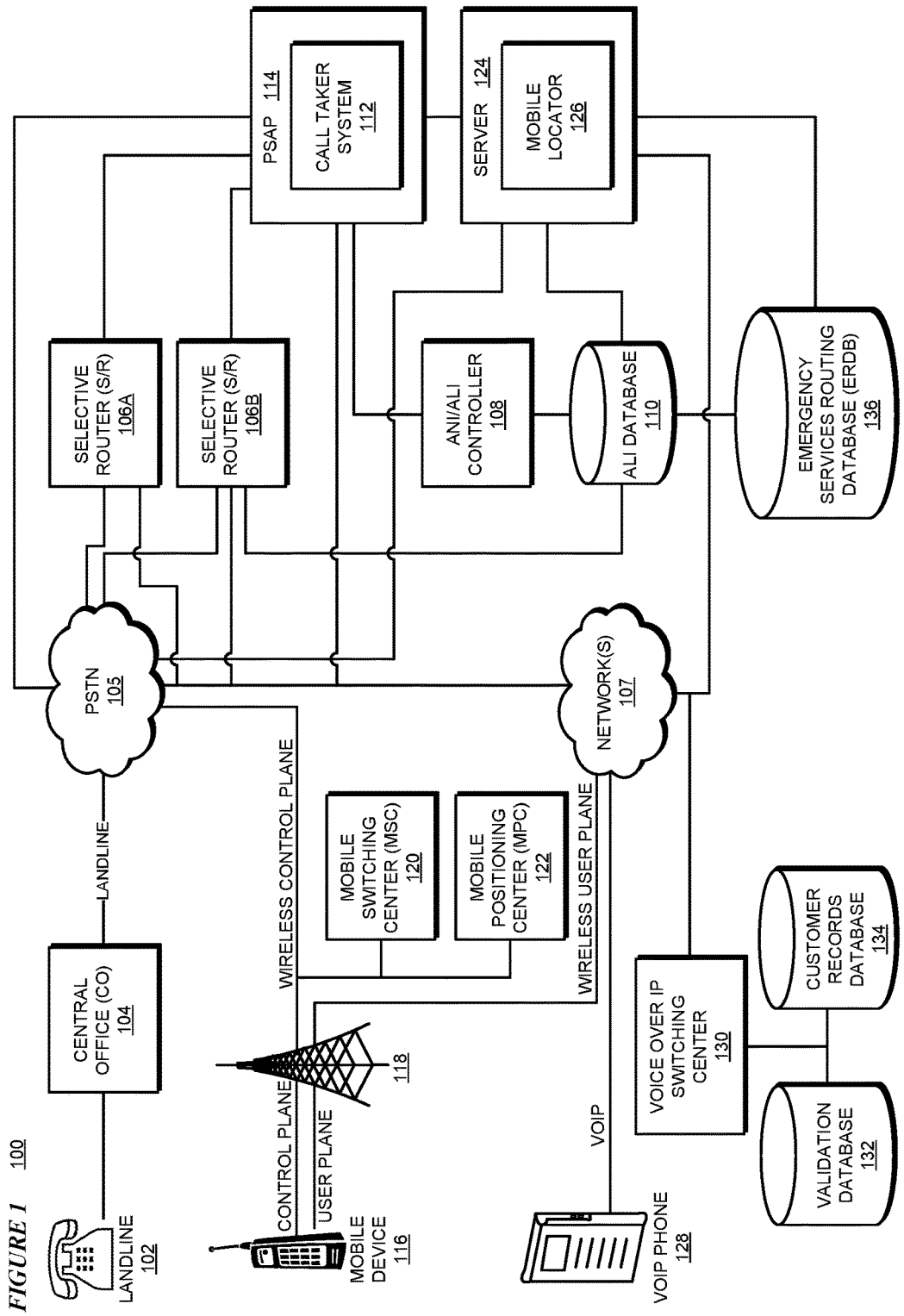
FIG. 1 depicts a block diagram of a communication network in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to emergency call service backup.

In an embodiment, a mobile device placing an emergency call or other emergency communication is used as a trigger point both for sending a location of the mobile device to the PSAP, as well as determining if the emergency call was completed via the normal communication path provided by the mobile communication service provider. In the embodiment, if the emergency call was not completed to the PSAP, the mobile device notifies a backup server via an alternative channel, and the backup server can take an appropriate action to providing an alternative communication path to complete the emergency call in the event that the main emergency call routing system has failed.

One or more embodiments, the emergency call initiating device provides both the location of the emergency based on the mobile device location itself as well as an indication whether the emergency call has completed or if a backup is required to complete the emergency call. Mobile devices have a multitude of connectivity mechanisms, such as WiFi or voice over IP (VoIP), that allows the mobile device to be used for emergency call handling instead of the normal cellular voice network. In many situations in traditional emergency call systems, the configuration of the call locating and routing components of emergency call processing are the same in the primary system and the backup system. Thus, if a primary system fails due to a configuration error, the backup system will likely similarly fail. Most failures of an emergency call system are not due to failure of the front end radio or data network. Accordingly, the mobile device is usually able to make regular voice calls and data connectivity remains. Various embodiments described herein exploit these facets to provide a backup system that is not subject to same-type configuration failures as the primary emergency system and enables both voice and voice over data paths from the mobile device to allow for the emergency call to proceed to connection with the appropriate PSAP.

One or more embodiments provide for a server having a mobile locator component and a mobile device with telemetry gathering and call detection capabilities to facilitate providing an emergency call service backup system using device user plane communications. The user plane is an important aspect of these embodiments as it is higher level than the control plan and thus independent of specific device or network topology. Control plan activities tend to require each carrier to implement something and are often single threaded, forcing the mobile device into an exclusive mode for the duration of that activity. In one or more embodiments, the user plane of the mobile device carries user data between the mobile device and the mobile network. In a particular embodiment, the mobile locator component of the server replaces an existing selective routing database (SRDB). In one or more embodiments the telemetry gathering and call detection capabilities of the mobile device are provided by the device manufacturer, while in one or more embodiments those capabilities are provided by an application that can be installed by the carrier or end user of the device.

In an embodiment, a mobile device makes a normal emergency communication, such as a 911 call regarding an emergency situation, utilizing a mobile communication carrier system. In the embodiment, the mobile device is also configured to send location/telemetry data to the mobile locator component in parallel with making the normal emergency call. In the embodiment, the mobile locator component uses the location and telemetry information to provide enhanced location information to the carrier. In a particular embodiment, the mobile location component provides the enhanced location information to the carrier.

In the embodiment, if the mobile device detects that the emergency call does not connect to the PSAP, the mobile device makes an additional invocation of the mobile locator component to report the failure of the emergency call providing information on the failed emergency call and any updated location/telemetry information. In the embodiment, the mobile locator component uses the location information and information from governing bodies to determine the PSAP that should have received the emergency call. In a particular embodiment, the mobile locator component can optionally notify the carrier about the failed emergency call providing the caller, location and PSAP information to the carrier. In a particular embodiment, the carrier may attempt to connect the call using another part of the carrier network. In another embodiment the carrier may attempt to connect the call using the same network, but bypassing the emergency location component.

In one or more embodiments, the mobile locator component uses a similar or an alternative call path to call the PSAP using the caller's mobile device as the originating device. Accordingly, the emergency call appears to the PSAP as a regular emergency call from the mobile device as the PSAP expects. A call taker at the PSAP can then communicate with the caller associated with the mobile device to answer the emergency call.

In an embodiment, the mobile locator component performs real time analysis and analytics about the locations in which emergency calls are failing and determines preventive actions that can be taken, for example selectively changing network routing in a geographic area, to avoid or mitigate future emergency call failures within the geographic area. In another embodiment, the mobile locator component functions as a data store for historical information regarding failed emergency calls and performs analysis and analytics on the historical information to provide information to the communication service provider (CSP) (e.g., the carrier) and/or the PSAPs regarding the performance of the CSP network.

Various embodiments described herein may provide one or more advantages over existing procedure for emergency call service backup. One advantage that may be provided by one or embodiments includes providing a backup emergency call system that is not subject to misconfiguration and hardware failures of the backup emergency system of the communication service provider.

The illustrative embodiments are described with respect to certain types of emergency communication processes, network devices, transmissions, validations, responses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
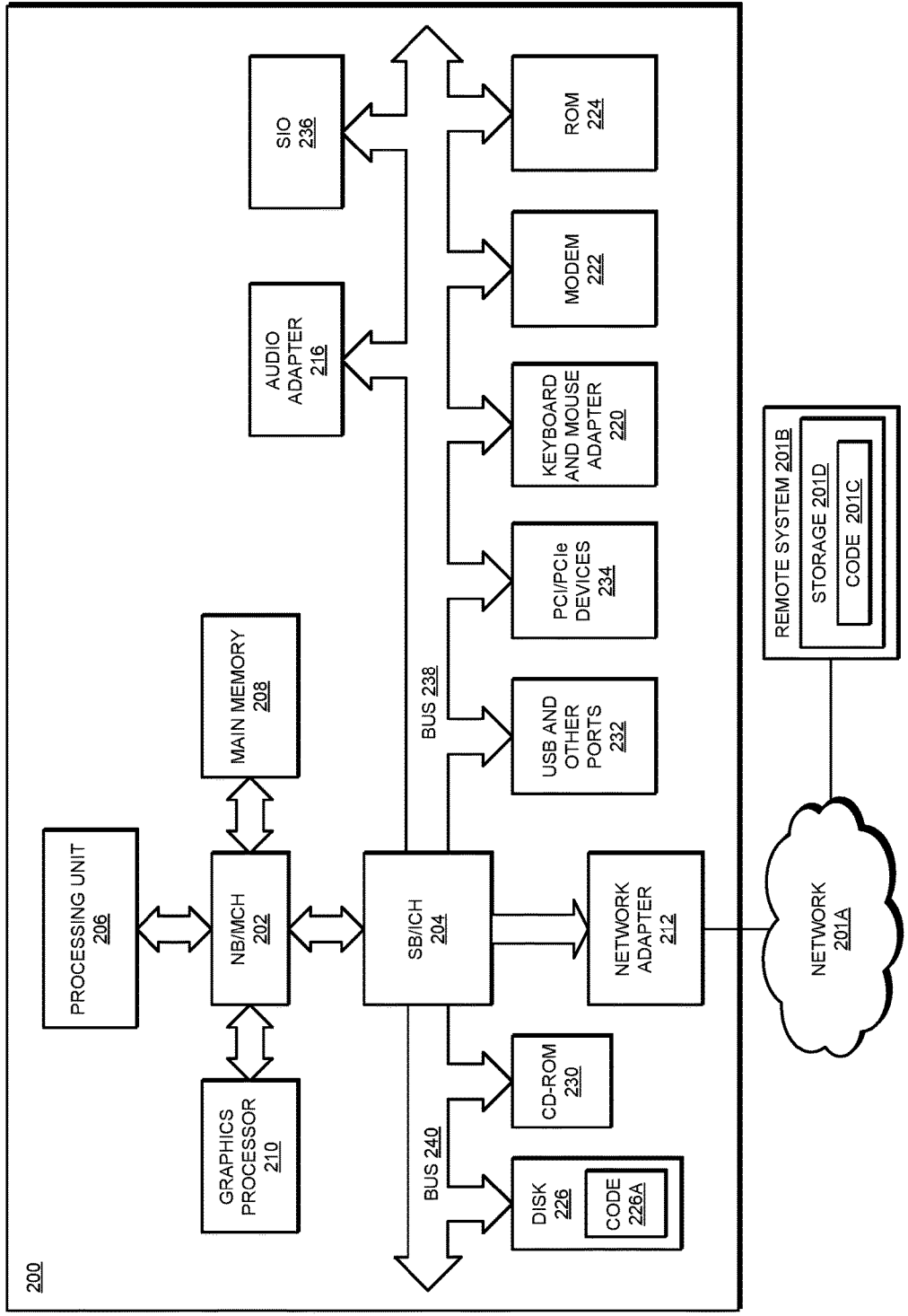
FIG. 2 depicts a block diagram of a data processing system in which illustrative embodiments may be implemented.

With reference to the figures and in particular with reference to FIGS. 1 and 2, these figures are example diagrams of communication network and data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a communication network 100 in which illustrative embodiments may be implemented. Communication network 100 includes a landline 102 in communication with a central office (CO) 104. CO 104 is in further communication with a public switched telephone network (PSTN) 105. PSTN is in further communication with a selective router (S/R) 106A and a selective router (S/R) 106B. S/R 106A and S/R 106B are in further communication with a call taker system 112 of a Public Safety Answering Point (PSAP) 114.

PSAP 114 is in further communication with an automatic number identification (ANI)/automatic location identifier (ALI) controller 108, which is in further communication with an ALI database 110. In one or more embodiments, ALI database 110 stores location information associated with an originating telephone number. ALI database 110 is in further communication with an emergency services routing database (ERDB) 136. PSAP 114 and PSTN 106 are both in further communication with one or more networks 107. In particular embodiments, network(s) 107 include one or more of a wide area network (WAN), a local area network (LAN), and the Internet. In an embodiment, a caller utilizing landline 102 initiates an emergency communication and one of S/R 106A and S/R 106B routes the call to call taker system 112 of PSAP 114.

Communication network 100 further includes a mobile device 116 in communication with a cellular radio network 118 a control plane connection and a user plane connection. Cellular radio network 118 is in further communication with a mobile switching center (MSC) 120, and a mobile positioning center (MPC) 122. Cellular radio network 118 is in further communication with PSTN 107 using a wireless control plane and network(s) 107 using a wireless user plane. MPC 120 functions to determine a location of a mobile device within the cellular network. MPC 120 is in further communication with ALI database 110. Communication network 100 further includes a server 124 including a mobile locator component 126 in communication with PSAP 114, ANI/ALI controller 108, ALI database 110, network(s) 107, and ERDB 136.

Mobile locator component 126 is configured to implement the functions of the mobile locator component described herein. In one or more embodiments, mobile locator component 126 of server 124 implements an embodiment of an algorithm for emergency call service backup system using device user plane communications as described herein. In an alternative embodiment, mobile locator component 126 is contained with mobile device 116.

In an embodiment, a caller utilizing mobile device 116 initiates an emergency communication and one of S/R 106A and S/R 106B attempts to route the emergency communication to call taker system 112 of PSAP 114. Mobile locator component 126 receives an indication of whether the attempt to connect mobile device 116 to PSAP 114 via the carrier network for the emergency communication has failed. If the attempt has failed, mobile locator component 126 attempts to establish a connection from mobile device 116 to PSAP 114 via an alternative communication path as further described herein.

Communication network 100 further includes a voice over IP (VoIP) phone 128 in communication with a voice over IP switching center 130 via network(s) 107. Voice over IP switching center 130 is in further communication with a customer records database 134 and a validation database 132. Customer records database 134 is configured to store records of users of VoIP phones such as VoIP phone 128, and validation database 132 is configured to store validation information to validate users found in customer records database 134. In an embodiment, a caller utilizing VoIP phone 128 initiates an emergency communication and one of S/R 106A and S/R 106B routes the call to call taker system 112 of PSAP 114.

Server 124 is an example role of certain data processing systems connected to communication network 100 and is not intended to exclude other configurations or roles for these data processing systems. Only as an example, and without implying any limitation to such architecture, FIG. 1 depicts certain components that are usable in an example implementation of an embodiment. For example, server 124 is depicted only as an example and not to imply a limitation to an architecture. As another example, an embodiment can be distributed across several data processing systems and a data network as shown, whereas another embodiment can be implemented on a single data processing system within the scope of the illustrative embodiments.

Mobile device 116 is an example of a mobile device described herein. For example, mobile device 132 can take the form of a smartphone, a tablet computer, a laptop computer, a client device in a stationary or a portable form, a wearable computing device, or any other suitable device. Any software application described as executing in another data processing system in FIG. 1 can be configured to execute in mobile device 132 or server 124 in a similar manner. Any data or information stored or produced in another data processing system in FIG. 1 can be configured to be stored or produced in mobile device 132 in a similar manner.

Server 124 may couple to components of communication network 100 using wired connections, wireless communication protocols, or other suitable data connectivity. In the depicted example, server 124 may provide data, such as boot files, operating system images, and applications to mobile device 116. Mobile device 132 may include their its own data, boot files, operating system images, and applications. Communication network 100 may include additional servers, clients, and other devices that are not shown.

In the depicted example, communication network 100 may be in communication with the Internet. Communication network 100 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, communication network 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, communication network 100 may be used for implementing a client-server environment in which the illustrative embodiments may be implemented. A client-server environment enables software applications and data to be distributed across a network such that an application functions by using the interactivity between a client data processing system and a server data processing system. Communication network 100 may also employ a service oriented architecture where interoperable software components distributed across a network may be packaged together as coherent business applications. Communication network 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as mobile device 116, server 124, in FIG. 1, or another type of device in which computer usable program code or instructions implementing the processes may be located for the illustrative embodiments.

Data processing system 200 is also representative of a data processing system or a configuration therein in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as applications 105 and 107 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
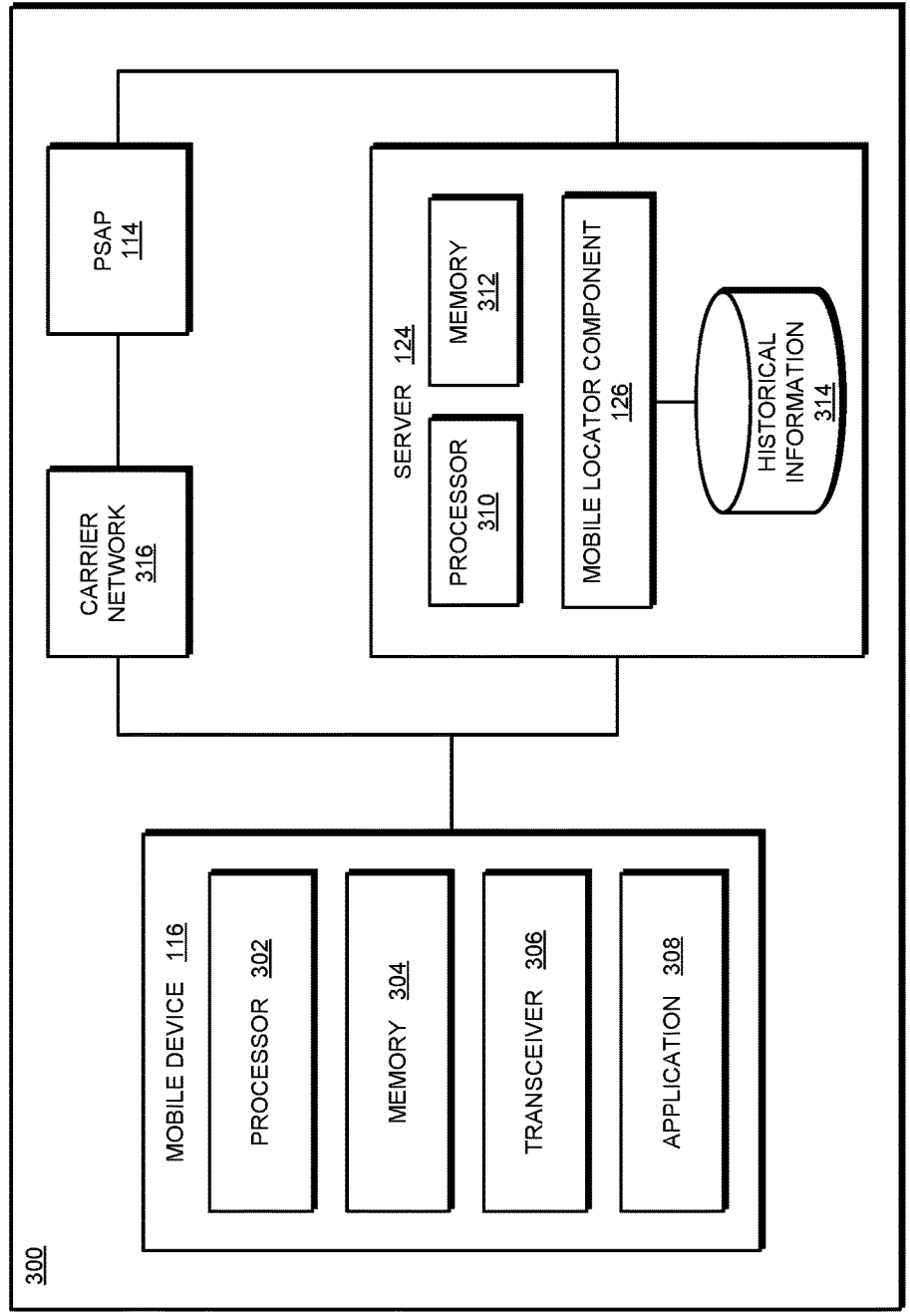
FIG. 3 depicts a block diagram of an example system architecture in accordance with an illustrative embodiment.

With respect to FIG. 3, this figure depicts a block diagram 300 of an example system architecture 300 in accordance with an illustrative embodiment. Mobile device 116 is an example of mobile device 116 of FIG. 1 and includes a processor 302, a memory 304, a transceiver 306, and an application 308. Processor 302 is configured to retrieve instructions from memory 304 and execute the instructions to perform various operations of mobile device 116 as described herein. Transceiver 306 is configured to communicate with one or more wireless communication networks such as a cellular network, WiFi network, Bluetooth network, satellite network or any other LAX, WAN, RAN, PAN or similar network. Application 308 is configured to perform various operations associated with emergency call service backup using device user plane communications by mobile device 116 as described herein. In particular embodiments, application 308 executes as a background process within mobile device 116.

Server 124 is an example of server 104 of FIG. 1 and includes a processor 310, a memory 312, and mobile locator component 126. Processor 314 is configured to retrieve instructions from memory 316 and execute the instructions to perform various operations of server 124 as described herein. Mobile locator component 126 is configured to perform operations associated with emergency call service backup using device user plane communications by server 124 as described herein. Server 124 further could include historical information database 314 configured to store historical information regarding failed emergency calls received by mobile locator component 126.

Mobile device 116 is in communication with server 124 and a carrier network 316. Carrier network 316 is associated with a wireless communication provider and Includes infrastructure to complete an emergency communication by mobile device 116 to PSAP 114.

Figure 4:
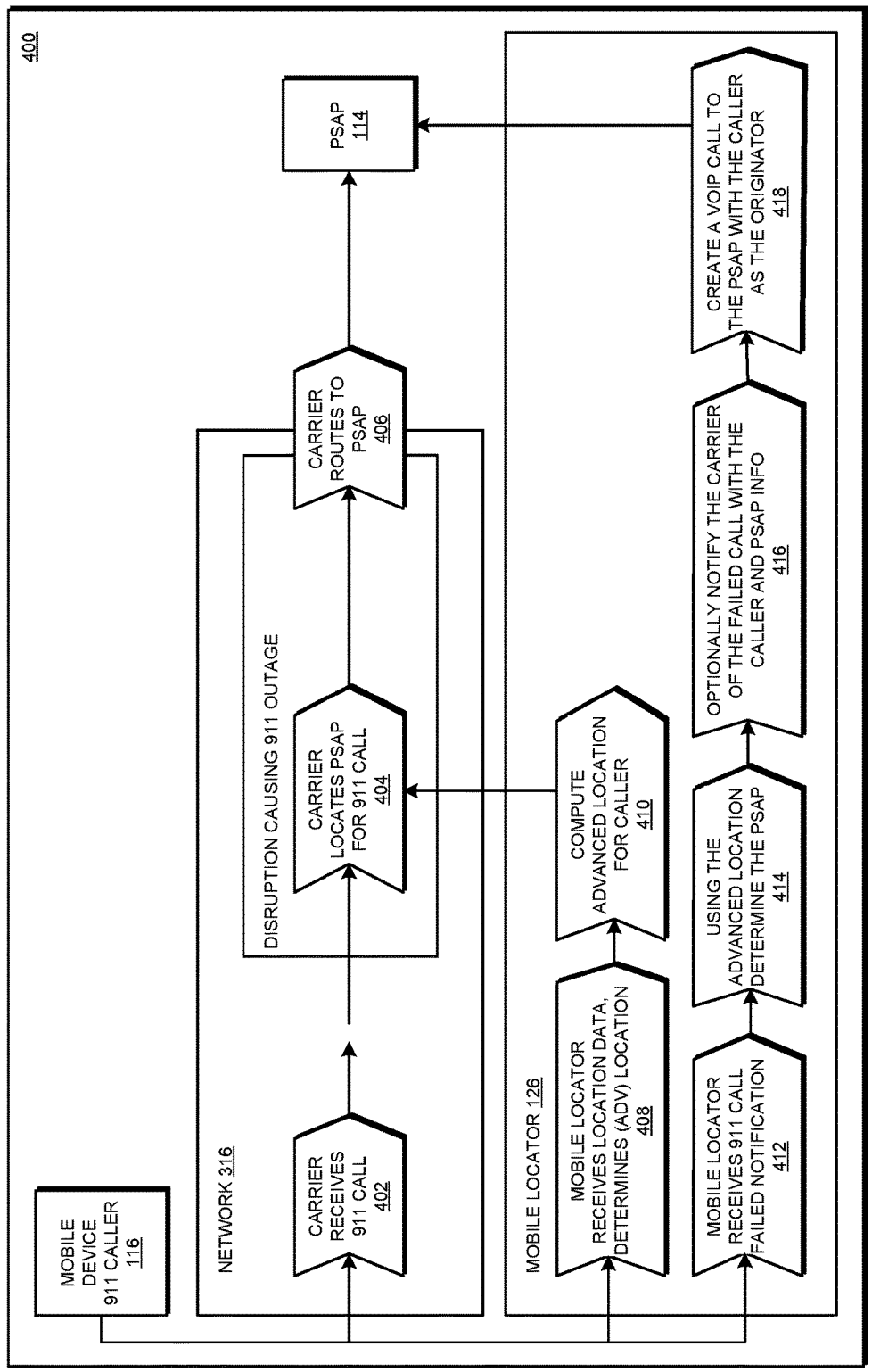
FIG. 4 depicts an example flow of a process for emergency call service backup using device user plane communications in accordance with an illustrative embodiment.

With respect to FIG. 4, this figures depicts an example flow 400 of a process for emergency call service backup using device user plane communications in accordance with an illustrative embodiment. In the embodiment, mobile device 116 makes an emergency call, e.g., a 911 call regarding an emergency situation and carrier network 316 receives the call in 402. In the embodiment, the mobile device is also configured to send location/telemetry data to mobile locator component 126 in parallel with making the normal emergency call. In 408, mobile locator component 126 receives the location data from mobile device 116. In 410, mobile locator component 126 computes advanced location information and provides the advanced location information to the carrier. In 404, carrier network 316 locates PSAP 114 for the emergency call. In 406, carrier network 316 attempts to route the emergency call to PSAP 114.

In the embodiment, if mobile device 116 detects that the emergency call does not connect to PSAP 114 via carrier network 316, mobile device 116 sends a notification of the failure of the emergency call to mobile locator component 126. In 412, mobile locator component 126 receives the notification of the failed emergency call. In 414, mobile locator component 126 uses the location information to determine that PSAP 114 should have received the emergency call. In 416, mobile locator component 126 optionally notifies carrier network 316 about the failed emergency call providing the caller, location and PSAP information to carrier network 316. In 418, mobile locator component 126 creates a VoIP call as an alternative path to PSAP 114 with mobile device 116 identified as the originator of the call. Accordingly, the emergency call appears to PSAP 114 as a regular emergency call from mobile device 116 while bypassing the emergency call system of carrier network 316.

Figure 5:
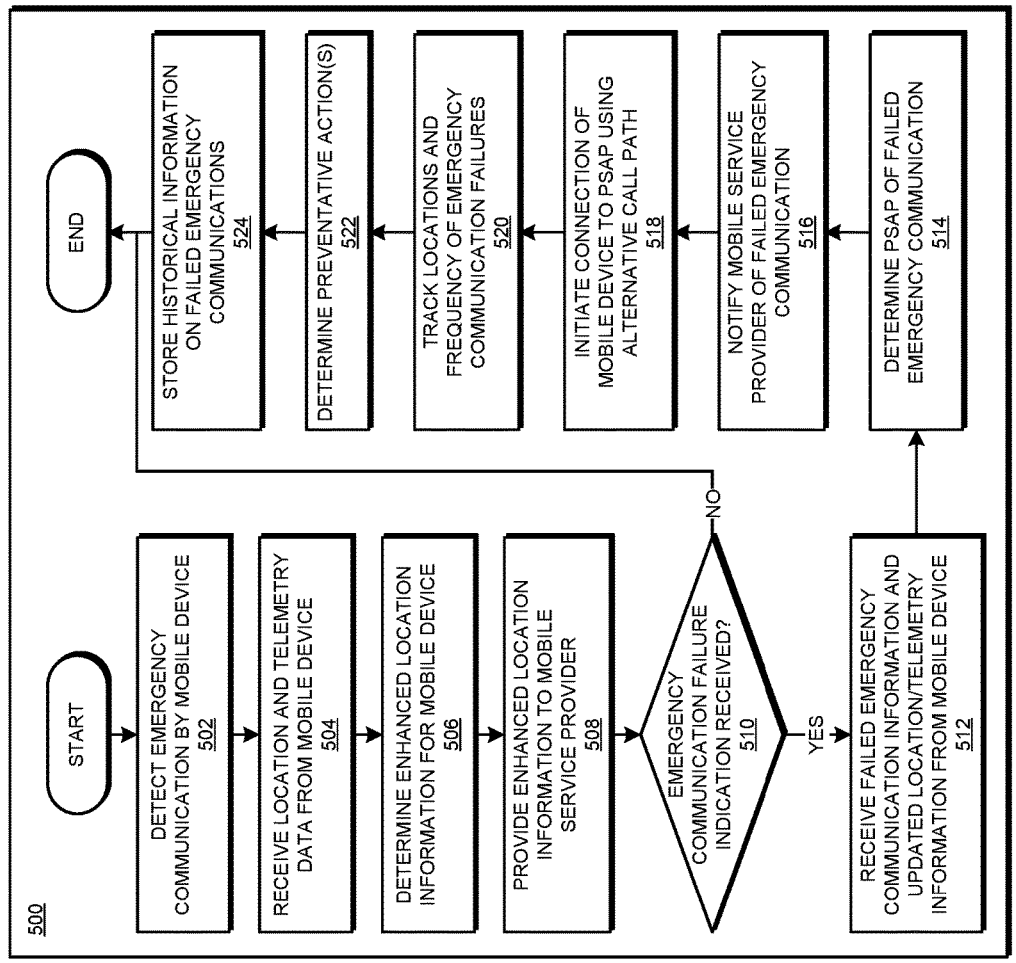
FIG. 5 depicts a flowchart of an example process for emergency call service backup using device user plane communications in accordance with an illustrative embodiment.

With reference to FIG. 5, this figure depicts a flowchart of an example process 500 for emergency call service backup using device user plane communications in accordance with an illustrative embodiment. In one or more embodiments, process 500 can be implemented in mobile locator component 126 of server 124.

In block 502, mobile locator component 126 detects initiation of an emergency communication by mobile device 116 to PSAP 114 using a first communication path in which the first communication path utilizes emergency communication components associated with the mobile communications service provider. In block 504, mobile locator component 126 receives location information and telemetry data of mobile device 116 from mobile device 116. In particular embodiments, the location information includes latitude and longitude of mobile device 116. In block 506, mobile locator component 126 determines enhanced location information for mobile device 116. In a particular embodiment, the enhanced location information includes one or more of a pressure, elevation, or floor of a building at which mobile device 116 is located. In block 508, mobile locator component 126 provides the enhanced location information to the mobile communications service provider associated with mobile device 116.

In block 510, mobile locator component 126 determines whether it has received an indication from mobile device 116 that the attempted emergency communication to PSAP 114 using the first path has failed. If mobile locator component 126 has not received the indication, process 500 ends and the emergency communication between mobile device 116 and PSAP 114 proceeds utilizing the first communication path including the emergency communication components associated with the mobile communications service provider. If mobile locator component 126 has received the indication that the attempted emergency communication to PSAP 114 using the first path has failed, process 500 continues to block 512.

In block 512, mobile locator component 126 receives failed emergency communication information and updated location/telemetry information from mobile device 116. In particular embodiments, the updated location/telemetry information includes a change in location and telemetry of mobile device 116 since the initiating of the emergency communication. In block 514, mobile locator component 126 determines an identity of the PSAP (i.e., PSAP 114) of the failed emergency communication. In block 516, mobile locator component 126 notifies the mobile communication service provider of the failed emergency communication to PSAP 114.

In block 518, mobile locator component 126 initiates connection of mobile device 116 to PSAP 114 using a second communication path including an alternative call path that bypasses the emergency communication components associated with the mobile communications service provider. In an embodiment, the second path includes a previously unused portion of a network of the mobile communications service provider. In a particular embodiment, the second communication path includes a VoIP connection between mobile device 116 and PSAP 114. In a particular embodiment, mobile locator component 126 notifies the mobile communications service provider of the failed emergency call. In another particular embodiment, mobile locator component 126 provides caller information, location information, and destination information of the mobile communications service provider. In still another particular embodiment, mobile locator component 126 receives a confirmation from the mobile communications service provider that the carrier was able to re-connect the emergency communication via an alternative mechanism.

In block 520, mobile locator component 126 tracks locations and frequency of failed emergency call communications of mobile device 116 and/or other mobile devices. In one or more embodiments, mobile locator component 126 further tracks identity information of the mobile communications service provider. In block 522, mobile locator component 126 determines one or more preventive actions, preventive actions that can be taken, for example selectively changing network routing in a particular geographic area, to avoid or mitigate future emergency call failures within the particular geographic area. In block 524, mobile locator component 126 stores historical information regarding failed emergency calls and performs analysis and/or analytics on the historical information to provide information to the mobile communications service provider regarding the performance of the mobile communications service provider network. Process 500 is ended thereafter.

In a particular embodiment, mobile locator component 126 analyzes the history of failed emergency calls to estimate a probability of whether a new call failing, and taking action to mitigate the possible failure based upon the probability. In a particular embodiment, mobile locator component 126 accumulates a number of instances of failed emergency calls including one or more of advanced location information from a mobile device, destination information, carrier type, and time.

In a particular embodiment, mobile locator component 126 determines a failure probability of a call originating from a particular geographical area over a specific carrier during a certain time of day. In another particular embodiment, mobile locator component 126 compares the failure probability against a predetermined threshold, and if the failure probability is greater than the predetermined threshold, preemptively place an alternative call to the destination. In another particular embodiment, mobile locator component 126 provides quantitative feedback to the mobile communications service provider to indicate specific geographical regions for improvement relative to emergency communications.

Thus, a computer implemented method, system or apparatus, and computer program product are provided in the illustrative embodiments for emergency call service backup using device user plane communications and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application may optionally be in a Software as a Service (SaaS) model. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for emergency communication service backup, the method comprising:
   detecting, by a mobile communications device, an initiation of an emergency communication with an emergency service associated with an emergency telephone number;
   attempting completion of the emergency communication using a first communication path associated with a mobile communications service provider;
   determining, by the mobile communication device, that the emergency communication using the first communication path has failed;
   determining, using location and telemetry data from the mobile communication device, an identity of a destination of the failed emergency communication;
   facilitating a connection of the mobile communications device to the identified destination using a second communication path, wherein the mobile communications device is identified to the determined destination as an originator of the connection;
   storing historical information of the failed emergency communications;
   determining a failure probability of subsequent emergency communications based upon the historical information; and
   determining at least one preventative action to mitigate subsequent emergency communication failures based upon the failure probability.

2. The method of claim 1, wherein the second communication path uses a previously unused portion of a network of the mobile communications service provider.

3. The method of claim 1, wherein the second communication path bypasses emergency communication components associated with the mobile communications service provider.

4. The method of claim 1 further comprising:
   determining enhanced location information based upon the location information and telemetry data; and
   providing the enhanced location information to the mobile communications service provider.

5. The method of claim 4, wherein the location information includes a latitude and longitude of the mobile device.

6. The method of claim 4, wherein the enhanced location information includes one or more of a pressure, elevation, or floor of a building associated with a location of the mobile device.

7. The method of claim 4, further comprising:
   receiving updated location information and telemetry data from the mobile device, the updated location information and telemetry data includes a change in location and telemetry of the mobile device since the initiating of the emergency communication.

8. The method of claim 1, further comprising:
   notifying the mobile communications service provider of the failed emergency communication.

9. The method of claim 1, further comprising:
   tracking locations of failed emergency communications of at least one of the mobile device and other mobile devices, a frequency of the failed emergency communications, and an identity information of the mobile communications service provider.

10. The method of claim 1, wherein the at least one preventative measure includes selectively changing network routing in a particular geographic area.

11. A computer usable program product comprising one or more computer-readable storage devices, and program instructions stored on at least one of the one or more storage devices, the stored program instructions comprising:
    program instructions to detect, by a mobile communications device, an initiation of an emergency communication with an emergency service associated with an emergency telephone number;
    program instructions to attempt completion of the emergency communication using a first communication path associated with a mobile communications service provider;
    program instructions to determine, by the mobile communication device, that the emergency communication using the first communication path has failed;
    program instructions to determine, using location and telemetry data from the mobile communication device, an identity of a destination of the failed emergency communication;
    program instructions to facilitate a connection of the mobile communications device to the identified destination using a second communication path, wherein the mobile communications device is identified to the determined destination as an originator of the connection;
    program instructions to store historical information of the failed emergency communications;
    program instructions to determine a failure probability of subsequent emergency communications based upon the historical information; and
    program instructions to determine at least one preventative action to mitigate subsequent emergency communication failures based upon the failure probability.

12. The computer usable program product of claim 11, wherein the second communication path uses a previously unused portion of a network of the mobile communications service provider.

13. The computer usable program product of claim 11, wherein the second communication path bypasses emergency communication components associated with the mobile communications service provider.

14. The computer usable program product of claim 11, further comprising:

program instructions to determine enhanced location information based upon the location information and telemetry data; and program instructions to provide the enhanced location information to the mobile communications service provider.

15. The computer usable program product of claim 14, wherein the location information includes a latitude and longitude of the mobile device.

16. The computer usable program product of claim 11, wherein the computer usable code is stored in a computer readable storage device in a data processing system, and wherein the computer usable code is transferred over a network from a remote data processing system.

17. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to detect, by a mobile communications device, an initiation of an emergency communication with an emergency service associated with an emergency telephone number;

program instructions to attempt completion of the emergency communication using a first communication path associated with a mobile communications service provider;

program instructions to determine, by the mobile communication device, that the emergency communication using the first communication path has failed;

program instructions to determine, using location and telemetry data from the mobile communication device, an identity of a destination of the failed emergency communication;

program instructions to facilitate a connection of the mobile communications device to the identified destination using a second communication path, wherein the mobile communications device is identified to the determined destination as an originator of the connection;

program instructions to store historical information of the failed emergency communications;

program instructions to determine a failure probability of subsequent emergency communications based upon the historical information; and program instructions to determine at least one preventative action to mitigate subsequent emergency communication failures based upon the failure probability.

\* \* \* \* \*